Sept. 19, 1950          J. JURA          2,523,217
SHOPPING BAG
Filed Feb. 28, 1945          2 Sheets-Sheet 1
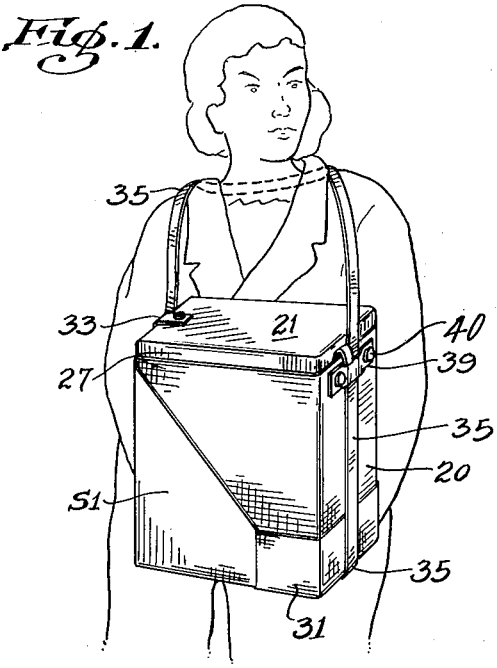
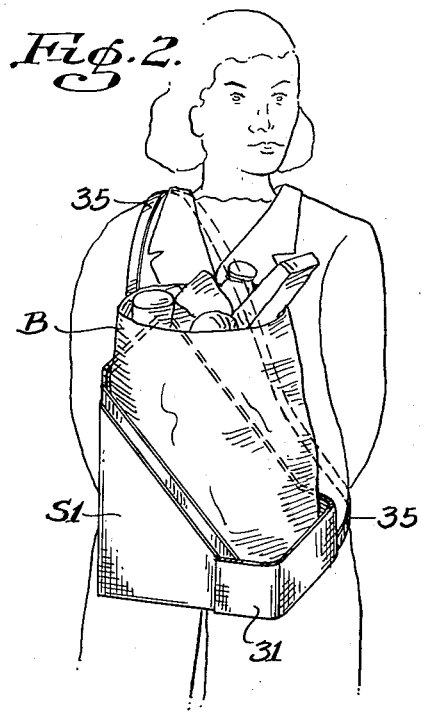
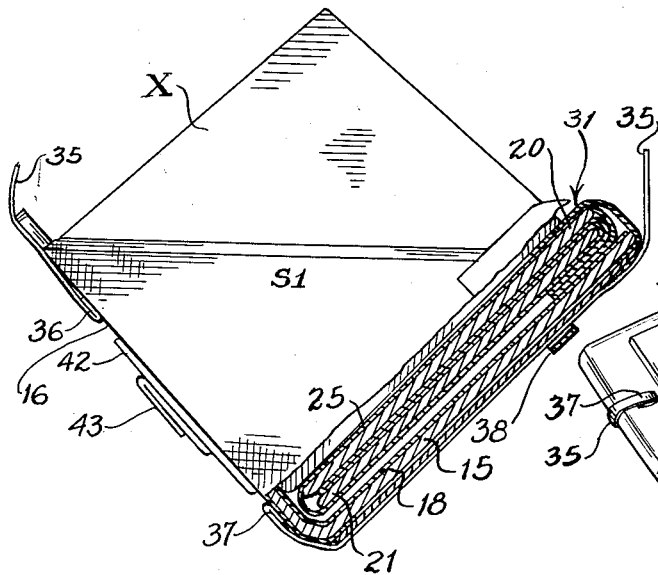
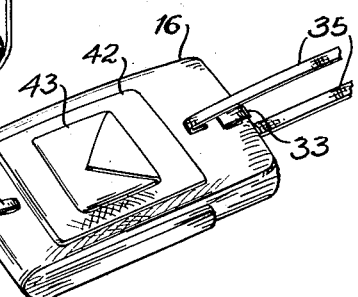
INVENTOR.
JOHN JURA
BY
ATTORNEY Sept. 19, 1950            J. JURA            2,523,217
SHOPPING BAG
Filed Feb. 28, 1945            2 Sheets-Sheet 2
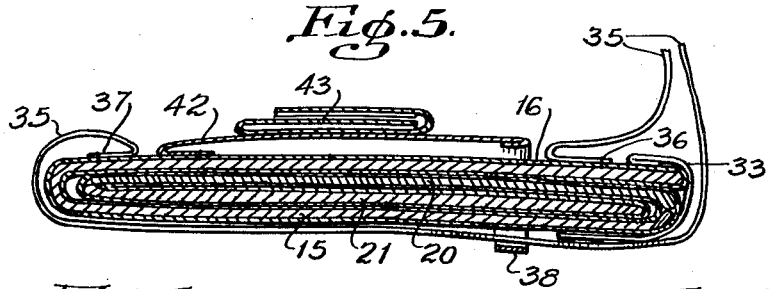
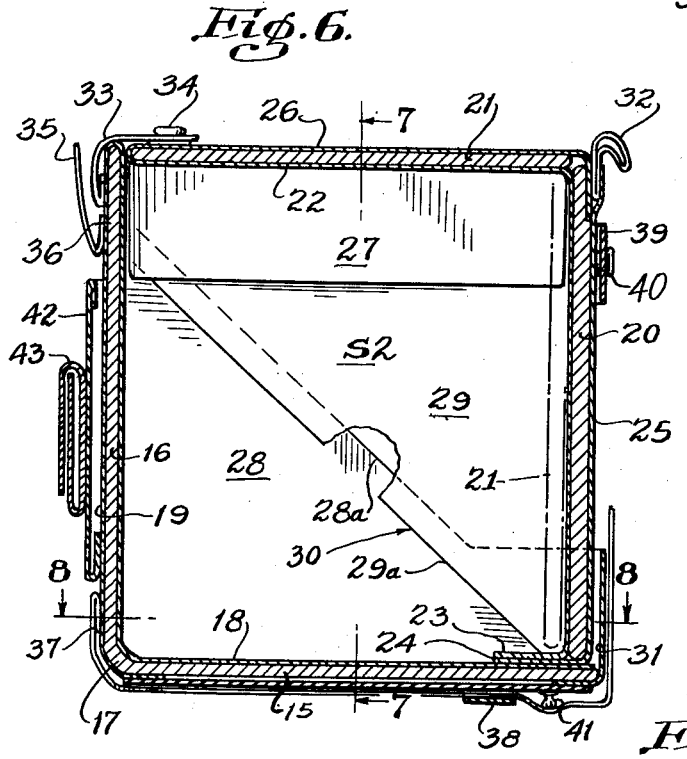 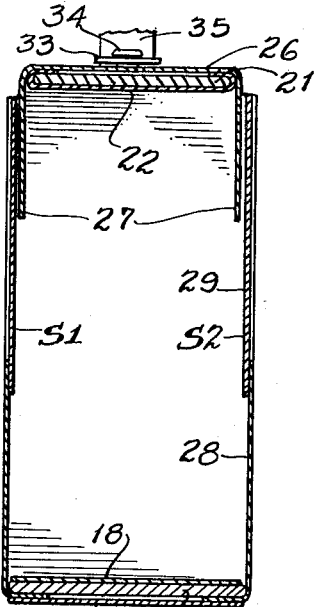
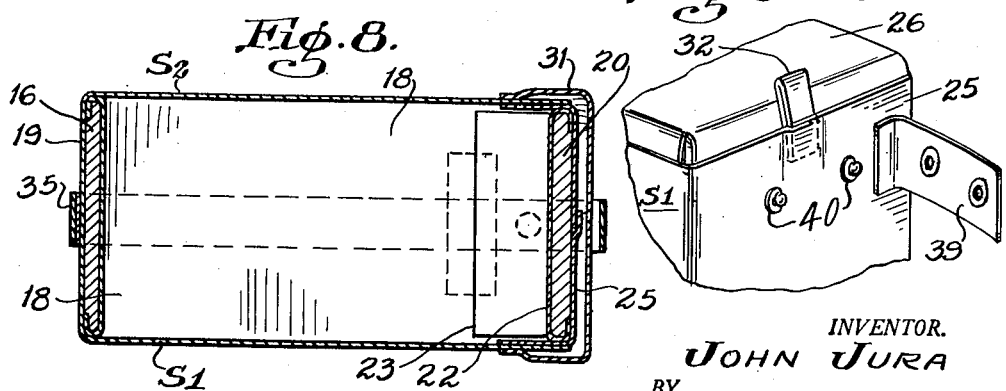
INVENTOR.
JOHN JURA
BY
ATTORNEY.

Patented Sept. 19, 1950

2,523,217

UNITED STATES PATENT OFFICE 2,523,217

SHOPPING BAG

John Jura, Hollywood, Calif.

Application February 28, 1945, Serial No. 580,100

4 Claims. (Cl. 224—5)

My invention relates to shopping bags, and it has for a purpose the provision of a bag which is suspendible from the torso of the user to receive and carry articles or bags or boxes containing articles as they are purchased in a store, whereby the arms and hands of the user are left free to select and deposit the articles in the bag, and the carrying of the articles by the bag is greatly facilitated because the combined weight thereof is imposed directly on the torso rather than on the arms of the user.

It is also a purpose of my invention to provide a shopping bag which, while providing the advantages above pointed out, is also quickly and easily converted into various forms to accommodate various shaped articles, boxes, or bags, and when not in use may be folded into such compact form that it can be stored in a woman's hand bag, or carried by a shoulder strap included in my bag.

A further purpose of my invention is the provision of a shopping bag which is further characterized by having pockets therein in which food ration coupons and money may be stored for ready access when purchasing food articles.

I will describe only one form of shopping bag embodying my invention and will then point out the novel features thereof in claims.

In the accompanying drawings:

Fig. 1 is a view showing in perspective one form of shopping bag embodying my invention in one of its extended positions, and as carried by the user.

Fig. 2 is a view similar to Fig. 1 showing another extended position of the shopping bag.

Figure 3 is an elevational view partly in section showing a third position of the shopping bag.

Fig. 4 is a perspective view showing the shopping bag in folded position when not in use.

Fig. 5 is a central longitudinal sectional view on an enlarged scale, of the shopping bag in folded position.

Fig. 6 is an enlarged vertical longitudinal sectional view of the shopping bag in the form shown in Fig. 1.

Fig. 7 is a sectional view taken on the line 7—7 of Fig. 6.

Fig. 8 is a horizontal sectional view taken on the line 8—8 of Fig. 6.

Fig. 9 is a fragmentary perspective view of the shopping bag showing one of the strap holding loops in open position.

Similar reference characters refer to similar parts in each of the several views.

Referring specifically to the drawings, my invention in its present embodiment comprises a bottom section 15 preferably formed integral with an end section 16, the two sections being constructed of pasteboard or any other suitable light and rigid material. These sections 15 and 16, at their meeting ends, are weakened or otherwise constructed to form a joint 17 by which the end section 16 is foldable to the position shown in Fig. 5. A flexible sheet 18 of any suitable fabric is glued or otherwise secured to the confronting sides of the sections 15 and 16 so as to span the joint 17 and to thereby reinforce the joint. Also is provided an outer fabric sheet 19 which is secured by gluing or otherwise to the outer sides of the sections 15 and 16 so as to span the outer side of the joint 17. Thus the sheets 18 and 19 lend the desired finish to these two bag sections and reinforce the sections as well as the joint.

The right hand end of the bottom section 15, as when viewed in Fig. 6, has secured thereto an end section 20 which likewise may be made of pasteboard or other suitable rigid material. On the upper end of this end section 20 is secured a top or closure section 21. These two sections 20 and 21 are secured one to the other at their confronting ends by a length of fabric 22, shown in Fig. 6 as secured to the inner sides of the sections 20 and 21. The upper end of this fabric 22 is extended around the free end of the top section 21, while the lower end is extended beyond the adjacent end of the section 20 to form a flap 23 which is secured to a companion flap 24, with the latter in turn secured to the cover sheet 18 for the bottom section 15. By these flaps 23 and 24 the end section 20 is hingedly fastened to the bottom section 15 so that it can be folded inwardly against the bottom section as will be more fully described hereinafter. The flap 24 is part of a length of fabric 25 which covers and is secured to the outer side of the end section 20.

The upper side of the top section 21 is covered by a sheet of fabric 26 suitably secured thereto and extended over the joint between the sections 20 and 21 where it is secured to the outer side of the section 20 (Fig. 6). By this arrangement the fabric sheet 26 coacts with the sheet 22 to provide a hinge connection between the sections 20 and 21 so that the section 21 can be folded on the section 20 as illustrated in broken lines in Fig. 6. The width of the fabric sheet 26 is such that it overhangs the longitudinal edges of the top section 21 to provide closure flaps 27.

The shopping bag also includes side sections spanning the end sections 16 and 20, and these side sections S2 and S1 are flexible to allow the required folding of the rigid sections of the bag to cause the latter to be converted into the various forms which it is adapted to assume for carrying articles, and also to allow the rigid sections to be folded into the compact form illustrated in Figs. 4 and 5 when the bag is not in use. These side sections S2 and S1 are made up of four sheets of suitable fabric secured to the rigid sections 15, 16, and 20.

To form either side section of the bag two of these fabric sheets indicated at 28 and 29 are employed. The sheet 28 is of triangular form and secured at two of its edges to the adjacent edges of the bottom section 15 and the end section 16 so that the other edge indicated at 28a extends diagonally between the sections 15 and 16 when the two are in extended position. The other sheet 29 is likewise of triangular form with one vertical edge extended around and secured to the outer side of the end section 20 so as to meet the corresponding edge of the sheet 29 forming a part of the other side section of the bag. The diagonal edge 29a of the sheet 29 parallels and is in overlapped relation to the edge 28a, and these edges are secured one to the other in this manner to provide a diagonal joint 30 which facilitates folding of the side sections in the manner desired.

The top section 21 is adapted to be folded inwardly to the inner side of the end section 20, and the latter inwardly between the side sections of the bag. With the bag in this form it is adapted to receive a conventional shopping bag designated at B in Fig. 2. To confine the bag B against displacement endwise of the bottom section 15, a flap 31 is secured to the bottom section 15 so as to extend above the adjacent end and sides of the bottom section 15. This flap is formed of fabric and may be folded inwardly between the side sections of the bag when the latter is used in the manner illustrated in Fig. 3.

A looped strap 32 is secured to the upper end of the end section 20 to facilitate the lifting of the end section from a horizontal to a vertical position. The top section 21 is adapted to be held in horizontal position, as illustrated in Fig. 6, by a tab 33 secured at one end to the outer side of the end section 16 and detachably secured to the top section 21 preferably by a separate fastener 34 of the snap type.

My shopping bag is adapted, either when in folded or extended position, to be suspended from the shoulders of the user. When the bag is in extended position and articles are contained therein, it is quite desirable to suspend the bag from the shoulders of the user so as to leave the arms and hands free to select the articles to be purchased and to place them within the bag or within a box or bag carried in the bag. An additional advantage in suspending the bag from the shoulders of the user is that the weight of the bag and the articles contained therein is carried by the torso of the user and not by the arms and hands. In this manner considerable weight can be carried which makes it extremely desirable for use by women in shopping.

The bag is adapted to be suspended from the shoulders of the user by the provision of a strap 35 secured at one end to the outer side of the end section 16 adjacent the upper end thereof as indicated at 36, and at the other end to the same section adjacent the bottom thereof, as indicated at 37. From the end 37 the strap is extended along the underside of the bottom section 15 and through a loop 38 secured to the bottom section.

From here the strap is extended upwardly to the outer side of the end section 20 and through a loop 39 which is held in closed position by a pair of snap fasteners 40. When the loop is in open position the strap can be detached from the end section 20 to allow folding of the bag to the position shown in Figs. 2, 4, and 5.

By securing the strap 35 in the manner just described a sufficient length of the strap is left free to be looped around the neck of the user in the manner illustrated in Fig. 1, the remainder of the strap functioning to support the bag and its contents and to assist in holding the end sections 16 and 20 in extended position with respect to the bottom section.

With the bag so extended it forms a box in which articles may be stored and carried, the top section 21 closing the top of the bag so as to conceal and protect the articles contained in the bag. Of course, the bag top may be left open by swinging the top section downwardly to the broken line position.

In order that the bag may be converted to the form shown in Fig. 2 it is first necessary to disconnect the tab 33 from the top section 21 when the latter may be folded inwardly to the broken line position shown in Fig. 6. Following this the end section 20 can now be folded inwardly and downwardly to overlie the top section. During this operation the seams or joints 30 of the side sections S2 and S1 cause such sections to fold inwardly in a triangular form, as illustrated in Fig. 2, so that the bag B may be placed on the end section 20 and between the side sections, the flap 31 serving to confine the bag B against displacement from that end of the bottom of the bag. With the bag in this form the strap 35 can still be looped over one shoulder and around the back, as illustrated so as to suspend the bag and its contents from the torso of the user.

With the bag folded as described in connection with illustration of Fig. 2, it can be suspended from the neck and shoulders of the user in the triangular form illustrated in Fig. 3, so as to receive and support a rectangular box X illustrated in solid lines in Fig. 3. In this use of my bag the end flap 31 is folded inwardly between the side sections as illustrated.

In order to cause the bag to assume the compact folding position shown in Figs. 4 and 5, which position it assumes when not in use to allow of its being stored in a woman's hand bag or to be conveniently carried by the strap 35, the flexible side sections S2 and S1 are folded inwardly on the end section 20, assuming that the end section is in the position shown in Fig. 2. Concurrently with this folding of the side sections the ends section 16 is folded inwardly to overlie the other sections when the tab 33 may be extended over the adjacent end of the bag to cause that portion of the fastener 34 carried thereby to engage a fastening element 41 on the bottom section 15, when the parts of the bag will be secured in the folded positions shown in Figs. 4 and 5.

As shown in Figs. 4, 5, and 6, a pocket 42 preferably of fabric is secured to the outer side of the end section 16, and this pocket may be designed to receive a food ration book. To the pocket 42 may be secured a second pocket 43 designed to receive money in bills or change form. Manifestly, with the pockets 42 and 43 so arranged they are both readily accessible in any extended position of the bag. Thus while the bag is being used to receive and carry articles the user can have access to the ration book and money in the purchase of the articles without disturbing the articles. Similarly the pockets 42 and 43 are accessible when the bag is in completely folded position as shown in Fig. 4 so that the contents of the pockets will be accessible without the necessity of unfolding the bag.

A bag constructed in accordance with my invention may be manufactured at a relatively low cost and yet be durable to receive and carry articles while suspended from the torso of the user and by virtue of the various forms to which the bag may be converted, it is rendered capable of carrying articles alone, or articles in bags, or in boxes, and, as pointed out herein, the bag being suspended from the torso of the user allows the user to carry many articles of considerable weight.

Although I have herein shown and described only one form of shopping bag embodying my invention, it is to be understood that various changes and modifications may be made therein without departing from the spirit of my invention and the spirit and scope of the appended claims.

I claim:

1. In a shopping bag unit of the type including a strap adapted to suspend the unit from the torso of the user, a receptacle for articles, comprising: a rigid bottom section; rigid end sections hingedly connected to said bottom section so as to be foldable thereon; flexible side sections connecting said end sections and said bottom section; a top section hingedly connected to one of said end sections so as to be foldable thereon and between said side sections; each of said side sections having a diagonal seam prestressed to cause said side sections to tend to fold whereby, upon folding said top section inwardly between said side sections the bag assumes the form of a triangular shaped hollow body with its top open.

2. In a shopping bag unit of the type including a strap adapted to suspend the unit from the torso of the user, a receptacle for articles, comprising: a rigid bottom section: rigid end sections hingedly connected to said bottom section so as to be foldable thereon; flexible side sections connecting said end sections and said bottom section; a top rigid section hingedly connected to one of said end sections so as to be foldable inwardly thereon, or to bridge said end sections at their upper ends; and means secured to the other of said end sections and detachably connected to said top section for retaining the latter in bridging relation to said end sections.

3. In a shopping bag, including: a rigid bottom section; rigid end sections hingedly connected to opposite ends of the bottom section so as to be foldable thereon and extendible to positions substantially perpendicular thereto; flexible side sections connecting the end sections to each other; a strap secured at its ends to one of the end sections and extending along the bottom section and the other end section and from both of the end sections to form a loop by which the bag can be suspended from the torso of the user; and means for securing the strap to the other of the end sections, said means being operable to allow detachment of the strap from said other end section to permit folding of the latter on the bottom section and the suspension of the bag by the strap from the unfolded end section and the bottom section.

4. In a shopping bag unit as embodied in claim 1, wherein a flap is secured to the bottom section and the side sections to confine an article supported on the top section.

JOHN JURA.

REFERENCES CITED

The following references are of record in the file of this patent:

UNITED STATES PATENTS

| Number | Name | Date |
| --- | --- | --- |
| 846,788 | Friedheim | Mar. 12, 1907 |
| 1,156,250 | Scott | Oct. 12, 1915 |
| 1,232,162 | Aldridge | July 3, 1917 |
| 1,561,138 | Charters | Nov. 10, 1925 |
| 1,643,189 | Urovsky | Sept. 20, 1927 |
| 2,028,825 | Christensen | Jan. 28, 1936 |